United States Patent
Hou et al.

(10) Patent No.: US 9,134,853 B2
(45) Date of Patent: Sep. 15, 2015

(54) COMPUTER SYSTEM AND RELATED TOUCH METHOD

(71) Applicant: Wistron Corporation, New Taipei (TW)

(72) Inventors: Chia-Chang Hou, New Taipei (TW); Po-Liang Huang, New Taipei (TW); Chia-Jui Liu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 31 days.

(21) Appl. No.: 14/259,152

(22) Filed: Apr. 23, 2014

(65) Prior Publication Data

US 2015/0109260 A1 Apr. 23, 2015

(30) Foreign Application Priority Data

Oct. 23, 2013 (TW) .............................. 102138266 A

(51) Int. Cl.
*G06F 3/042* (2006.01)
*G06F 3/0354* (2013.01)

(52) U.S. Cl.
CPC ............ *G06F 3/042* (2013.01); *G06F 3/03545* (2013.01)

(58) Field of Classification Search
CPC .............. G06F 3/0304; G06F 3/03542; G06F 3/03545; G06F 3/042; G06F 220/0383; G06F 220/03843
See application file for complete search history.

(56) References Cited

U.S. PATENT DOCUMENTS

| | | | |
|---|---|---|---|
| 5,051,736 A | 9/1991 | Bennett | |
| 6,100,538 A * | 8/2000 | Ogawa | 250/559.29 |
| 6,781,570 B1 * | 8/2004 | Arrigo et al. | 345/158 |
| 8,274,496 B2 * | 9/2012 | Ung et al. | 345/176 |
| 8,605,061 B2 * | 12/2013 | Ho et al. | 345/179 |
| 2011/0043492 A1 * | 2/2011 | Elsasser et al. | 345/179 |
| 2011/0073385 A1 * | 3/2011 | Ko | 178/19.05 |
| 2011/0102373 A1 * | 5/2011 | Chang et al. | 345/175 |
| 2011/0169775 A1 * | 7/2011 | Liaw et al. | 345/175 |
| 2012/0019488 A1 * | 1/2012 | McCarthy | 345/179 |
| 2012/0162077 A1 * | 6/2012 | Sze et al. | 345/163 |
| 2013/0113762 A1 * | 5/2013 | Geaghan | 345/179 |
| 2013/0207937 A1 * | 8/2013 | Lutian et al. | 345/175 |
| 2013/0257812 A1 | 10/2013 | Wang | |
| 2014/0085266 A1 * | 3/2014 | Lim | 345/175 |
| 2014/0306931 A1 * | 10/2014 | Wei et al. | 345/175 |
| 2015/0002473 A1 * | 1/2015 | Huang et al. | 345/175 |
| 2015/0035788 A1 * | 2/2015 | Chen et al. | 345/174 |

FOREIGN PATENT DOCUMENTS

| | | |
|---|---|---|
| CN | 103268160 A | 8/2013 |
| TW | 201339905 | 10/2013 |

OTHER PUBLICATIONS

Office action mailed on Jun. 8, 2015 for the Taiwan application No. 102138266, filing date: Oct. 23, 2013, p. 2 line 2-26, p. 3-5 and p. 6 line 1-3.

* cited by examiner

*Primary Examiner* — Joe H Cheng
(74) *Attorney, Agent, or Firm* — Winston Hsu; Scott Margo

(57) ABSTRACT

The present disclosure provides a computer system. The computer system comprises a stylus pen and an optical touch system. The stylus pen comprises an optical lens for retrieving relative movement information of the stylus pen when the stylus pen is moving, a first processing unit for analyzing the relative movement information and generating a control signal and a light-emitting unit for sending an optical signal according to the control signal, wherein the optical signal includes the relative movement information. The optical touch system comprises a sensing module for receiving the optical signal and a second processing unit, for calculating relative coordinates of the stylus pen according to the relative movement information included in the optical signal.

12 Claims, 3 Drawing Sheets

COMPUTER SYSTEM AND RELATED TOUCH METHOD

BACKGROUND OF THE INVENTION

1. Field of the Invention

The present invention relates to a computer system and related touch method, and more particularly, to a computer system with high accuracy and related touch method.

2. Description of the Prior Art

With the improvement of the touch technologies, touch devices have been commonly used as a data input tool for all kinds of consuming electronic products, such as monitors, an All in Ones (AIOs), mobile phones, personal digital assistants (PDAs) and tablets. Compared to other touch technologies, such as resistive technology and capacitive technology, the optical touch devices have more advantages of low cost and easy implementation, especially in a large panel size.

However, the current optical touch technology is limited to the optic characteristics. The optical touch technology is not able to perform accurate operation (e.g. in pixels). The accuracy has been a problem for the optical touch technology. For example, drawing or operating on a large screen (above 42") needs more delicate accuracy.

SUMMARY OF THE INVENTION

It's therefore an objective of the present invention to provide a computer system to execute highly accurate touch operation.

The present invention discloses a computer system. The computer system comprises a stylus pen and an optical touch system. The stylus pen comprises an optical lens for retrieving relative movement information of the stylus pen when the stylus pen is moving, a first processing unit for analyzing the relative movement information and generating a control signal and a light-emitting unit for sending an optical signal according to the control signal, wherein the optical signal includes the relative movement information. The optical touch system comprises a sensing module for receiving the optical signal and a second processing unit, for calculating relative coordinates of the stylus pen according to the relative movement information included in the optical signal.

The present invention further discloses a touch method for a computer system. The computer system comprises a stylus pen and an optical touch system. The touch method comprises the stylus pen retrieving relative movement information of the stylus pen when the stylus pen is moving; the stylus pen analyzing the relative movement information and generating a control signal; the stylus pen sending an optical signal according to the control signal, wherein the optical signal includes the relative movement information; the optical touch system receiving the optical signal; and the optical touch system calculating relative coordinates of the stylus pen according to the relative movement information included in the optical signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
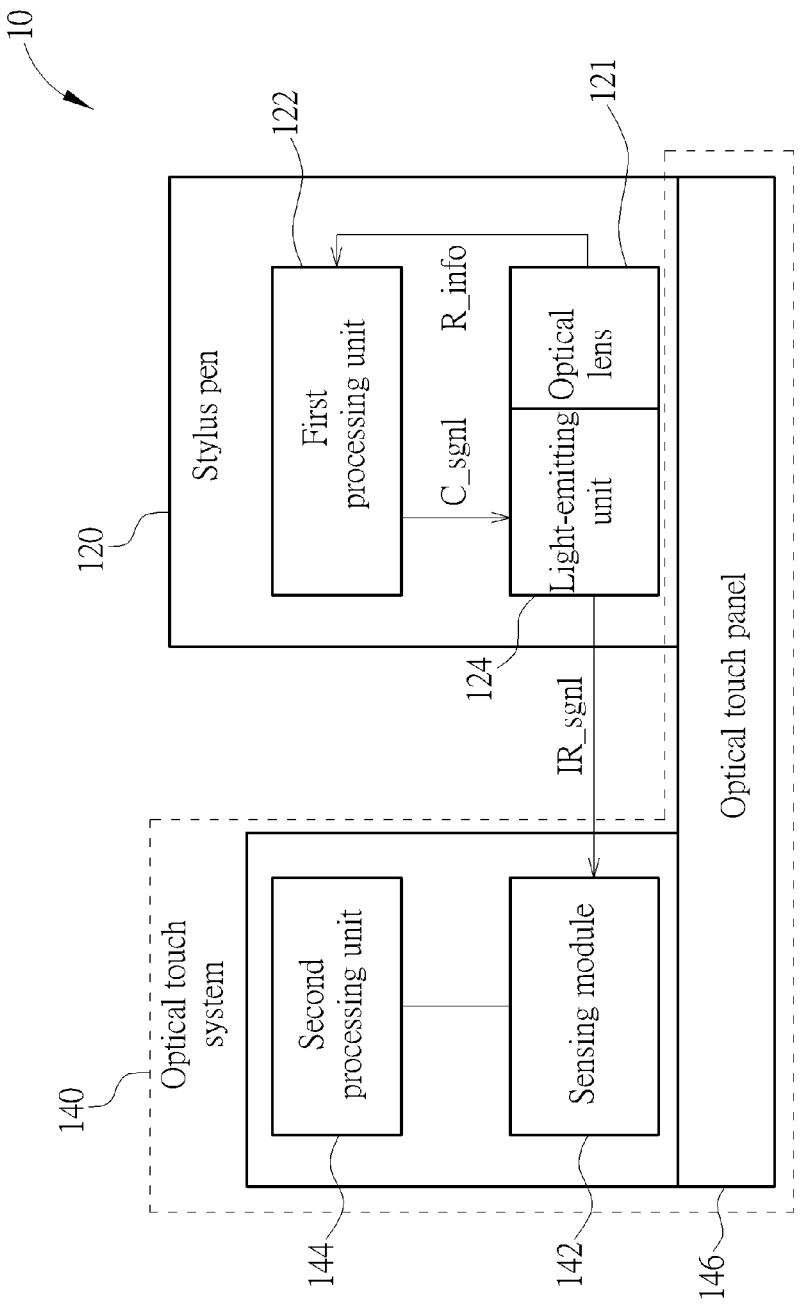
FIG. 1 is an exemplary schematic diagram of a computer system.

Please refer to FIG. 1, which is an exemplary schematic diagram of a computer system 10. The computer system 10 includes a stylus pen 120 and an optical touch system 140. The stylus pen 120 includes an optical lens 121, a first processing unit 122 and a light-emitting unit 124. The optical lens 121 could be a laser lens. The optical lens 121 is used for retrieving relative movement information R_info of the stylus pen 120 when the stylus pen 120 is moving. The relative movement information R_info includes a distance and a direction of a movement of the stylus pen 120. The first processing unit 122 is used for analyzing the relative movement information R_info and generating a control signal C_sgnl. The light-emitting unit 124 is used for sending an optical signal IR_sgnl according to the control signal C_sgnl. The light-emitting unit 124 could be an infrared (IR) LED and the optical signal $IR_{13}$ sgnl could be an infrared signal. The optical signal IR_sgnl includes the relative movement information R_info. The optical touch system 140 includes a sensing module 142, a second processing unit 144 and an optical touch panel 146. The sensing module 142 is used for receiving the optical signal IR_sgnl. The second processing unit 144 is used for calculating relative coordinates of the stylus pen 120 according to the relative movement information R_info included in the optical signal IR_sgnl. When the stylus pen 120 is moving on the optical touch panel 146, the optical touch panel 146 is used for providing a coordinate system, and thereby the absolute location of the stylus pen 120 on the optical touch panel 146 according to an image of the stylus pen 120 can be calculated. Therefore, the computer system 10 can perform more accurate operation by reading the relative movement information R_info through the optical lens 121.

To be more specific, the sensing module 142 retrieves the image of the stylus pen 120 when the stylus pen 120 first touches the optical touch panel 146. When the stylus pen 120 is moving on the optical touch panel 146 the stylus pen 120 retrieves the relative movement information R_info (e.g. the distance and the direction of the movement) of the stylus pen 120 on the optical touch panel 146 through the optical lens 121 and provides the relative movement information R_info to the first processing unit 122. The first processing unit 122 analyzes the relative movement information R_info and controls the light-emitting unit 124 to send the optical signal IR_sgnl according to the control signal C_sgnl. In some examples, the first processing unit encodes the relative movement information R_info to a flash frequency of the optical signal IR_sgnl. When the light-emitting unit 124 receives the optical signal C_sgnl, the light-emitting unit 124 sends the optical signal IR_sgnl with the relative movement information R_info. The sensing module 142 of the optical touch system 140 receives the optical signal IR_sgnl and sends it to the second processing unit 144. When the second processing unit 144 receives the optical signal IR_sgnl, the second processing unit 144 decodes the relative movement information R_info included in the optical signal IR_sgnl, and calculates the relative coordinates of the stylus pen 120 on the optical touch panel 146. After the stylus pen 120 leaves the optical touch panel 146, the optical touch system 140 needs to retrieve the absolute coordinates of the stylus pen 120 again for the next touch.

Figure 2:
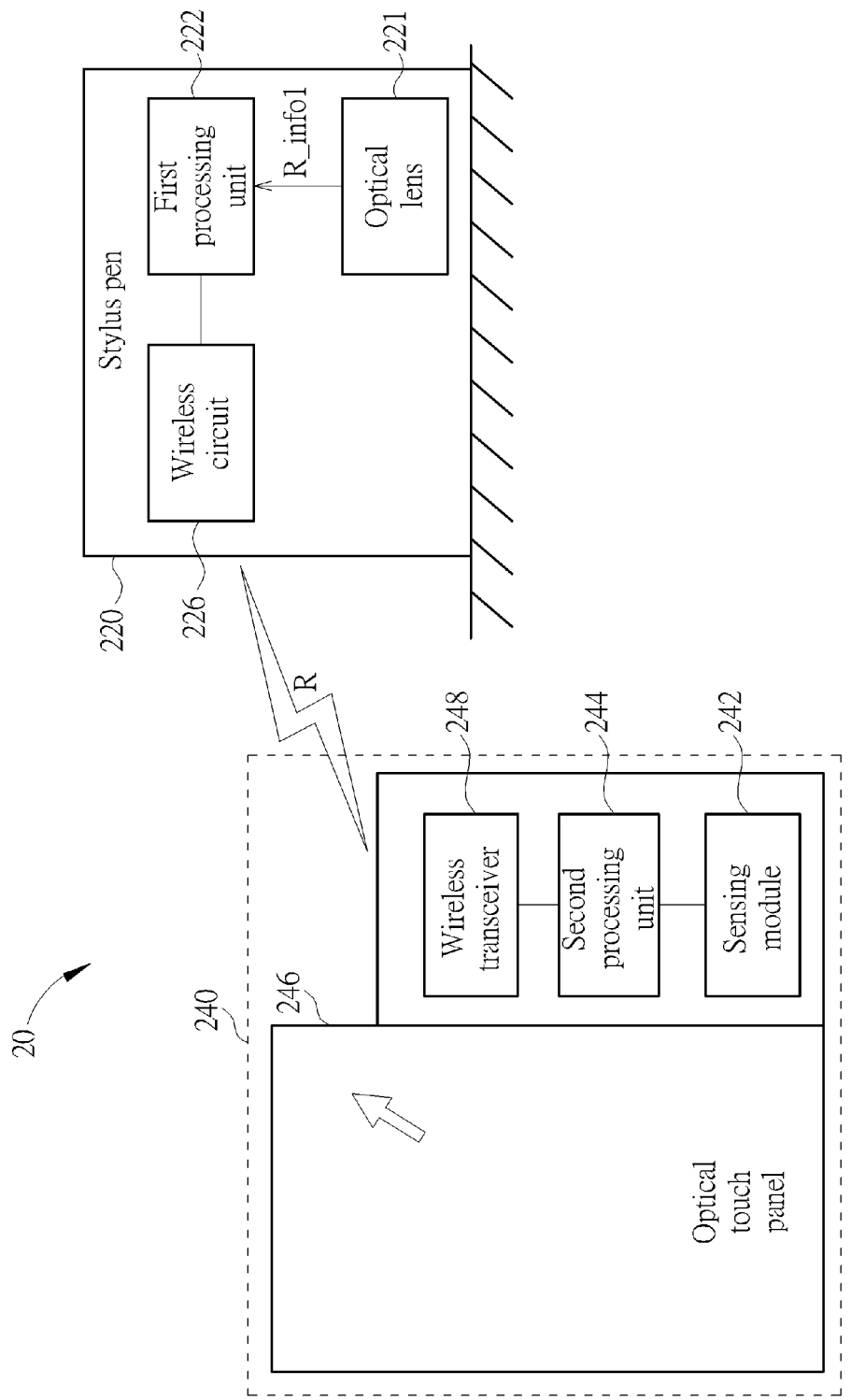
FIG. 2 is an exemplary schematic diagram of a computer system.
Figure 3:
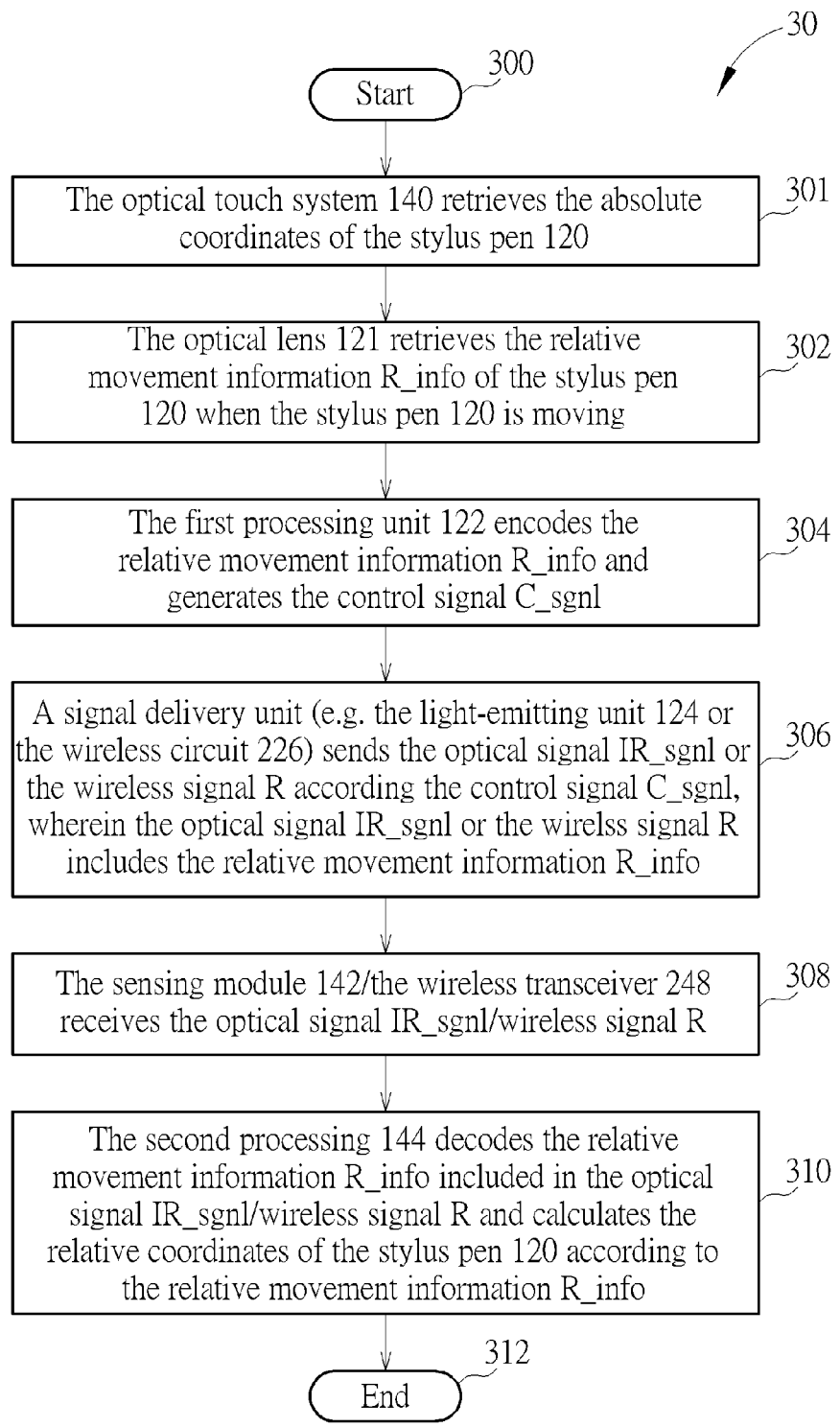
FIG. 3 is an exemplary flow chart of a process.

In some examples, a wireless circuit can replace the above-mentioned optical signal IR_sgnl in order to send the relative movement information R_info. Please refer to FIG. 2, FIG. 2 is an exemplary schematic diagram of a computer system 20. The computer system 20 includes a stylus pen 220 and an optical touch system 240. The stylus pen 220 includes an optical lens 221, a first processing unit 222 and a wireless circuit 226. The optical touch system 240 includes a sensing module 242, a second processing unit 244, an optical touch panel 246 and a wireless transceiver 248. The functions of the optical lens 221, the first processing unit 222, the sensing module 242 and the second processing unit 244 and the optical touch panel 246 are identical or similar to the optical lens 121, the first processing unit 122, the sensing module 142 and the second processing unit 144 and the optical touch panel 146, and thus omitted herein. The difference between the computer system 20 and the computer system 10 is that the computer system 20 includes the wireless circuit 226 and the wireless transceiver 248. When the stylus pen 220 is moving on the optical touch panel 246, the optical lens 221 retrieves the relative movement information R_info. After the relative movement information R_info is provided for the first processing unit 222, the first processing unit 222 encodes the relative movement information R_info and controls the wireless circuit 226 to send a wireless signal R according to the control signal C_sgnl. The wireless transceiver 248 of the optical touch system 240 receives the wireless signal R and the second processing unit 244 decodes the relative movement information R_info included in the wireless signal R. The stylus pen 220's relative coordinates on the optical touch panel 246 are calculated according to the relative movement information R_info.

Besides, when the stylus pen 120/220 operates on a non-touch surface the location of the stylus pen 120/220 on the non-touch surface corresponds to a cursor on the touch panel 146/246. That is, the cursor has the same movement as the stylus pen 120/220. When the stylus pen 120/220 is moving on the non-touch surface, the stylus pen 120/220 continues to retrieve the relative movement information R_info1 (the distance and the direction of the movement of the stylus pen 120/220) on the non-touch surface through the optical lens 121/221 and provides the relative movement information R_ino1 for the first processing unit 122/222. The first processing unit 122/222 encodes the relative movement information R_info1 to the optical signal IR_sgnl or includes the relative movement information R_info1 in the wireless signal R. The light-emitting unit 124/wireless circuit 226 sends the relative movement information R_info1 in the optical signal IR_sgnl or the wireless signal R. When the sensing module 142/wireless transceiver 248 of the optical touch system 140/240 receives the optical signal IR_sgnl or the wireless signal R sent by the wireless transceiver 226, the second processing unit 144/244 decodes the relative movement information R_info1 includes in the optical signal IR_sgnl or the wireless signal R and calculates the relative coordinates of the stylus pen 120/220 on the non-touch surface. Further, the relative coordinates of the stylus pen 120/220 corresponding to the cursor on the optical touch panel 146/246 is calculated. The stylus pen 120/220 can be considered a remote mouse, continuing to report to the optical touch system 140/240 to control the cursor on the optical touch panel 146/246.

Regarding to the operation of the computer system 10, it can be synthesized into a process 30. The process 30 is used in the computer system 10 for improving the operation accuracy for the computer system 10. The process 30 includes the following steps:

Step 300: Start.

Step 301: The optical touch system 140 retrieves the absolute coordinates of the stylus pen 120.

Step 302: The optical lens 121 retrieves the relative movement information R_info of the stylus pen 120 when the stylus pen 120 is moving.

Step 304: The first processing unit 122 encodes the relative movement information R_info and generates the control signal C_sgnl.

Step 306: A signal delivery unit (e.g. the light-emitting unit 124 or the wireless circuit 226) sends the optical signal IR_sgnl or the wireless signal R according the control signal $C_{13}$ sgnl, wherein the optical signal IR_sgnl or the wireless signal R includes the relative movement information R_info.

Step 308: The sensing module 142/the wireless transceiver 248 receives the optical signal IR_sgnl/wireless signal R.

Step 310: The second processing 144 decodes the relative movement information R_info included in the optical signal IR_sgnl/wireless signal R and calculates the relative coordinates of the stylus pen 120 according to the relative movement information R_info.

Step 312: End.

According to the process 30, the computer system 10 can have more accurate performance. The detailed operation can be found above, and thus omitted herein.

To sum up, the optical touch system first retrieves the absolute coordinates of the stylus pen. Then, the optical lens retrieves the relative movement information when the stylus pen is moving and provides the relative movement information for the first processing unit. The first processing unit encodes the relative movement information and controls the light-emitting unit/wireless circuit to send the optical signal/wireless signal. After the sensing module/wireless transceiver of the optical touch system receives the optical signal/wireless signal, the second processing unit decodes the relative movement information included in the optical signal/wireless signal and calculates the relative coordinates of the stylus pen according to the relative movement information. In this situation, the high accuracy can be achievement for the stylus operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system comprising:
   a stylus pen comprising:
      an optical lens, for retrieving relative movement information of the stylus pen when the stylus pen is moving;
      a first processing unit, for analyzing the relative movement information and generating a control signal; and
      a light-emitting unit, for sending an optical signal according to the control signal, wherein the optical signal includes the relative movement information; and
   an optical touch system comprising:
      a sensing module, for receiving the optical signal; and
      a second processing unit, for calculating relative coordinates of the stylus pen according to the relative movement information included in the optical signal.

2. The computer system of claim 1, wherein the sensing module is further used for retrieving an image of the stylus pen when the stylus pen first touches the optical touch system and the second processing unit is further used for calculating absolute coordinates of the stylus pen on the optical touch system according to the image.

3. The computer system of claim 2, wherein the optical touch system is further used for retrieving the absolute coordinates of the stylus pen again after the stylus pen leaves the optical touch system.

4. The computer system of claim 1, wherein the relative movement information comprise a distance and a direction of a movement of the stylus pen.

5. The computer system of claim 1, wherein analyzing the relative movement information comprises encoding the relative movement information to a flash frequency of the optical signal.

6. The computer system of claim 1, wherein the stylus pen further comprises a wireless module for sending a wireless signal, wherein the wireless signal includes the relative movement information.

7. A touch method for a computer system, the computer system comprising a stylus pen and an optical touch system, the touch method comprising:
- the stylus pen retrieving relative movement information of the stylus pen when the stylus pen is moving;
- the stylus pen analyzing the relative movement information and generating a control signal;
- the stylus pen sending an optical signal according to the control signal, wherein the optical signal includes the relative movement information;
- the optical touch system receiving the optical signal; and
- the optical touch system calculating relative coordinates of the stylus pen according to the relative movement information included in the optical signal.

8. The touch method of claim 7 further comprising the optical touch system retrieving an image of the stylus pen when the stylus pen first touches the optical touch system and calculating absolute coordinates of the stylus pen on the optical touch system according to the image.

9. The touch method of claim 8 further comprising the optical touch system for retrieving the absolute coordinates of the stylus pen again after the stylus pen leaves the optical touch system.

10. The touch method of claim 7, wherein the relative movement information comprise a distance and a direction of a movement of the stylus pen.

11. The touch method of claim 7, wherein the step of analyzing the relative movement information comprises encoding the relative movement information to a flash frequency of the optical signal.

12. The touch method of claim 7 further comprising the stylus pen sending a wireless signal, wherein the wireless signal includes the relative movement information.

* * * * *